July 4, 1950     H. H. STYLL     2,514,103
PLASTIC TOP ARM SPECTACLE FRAME
HAVING METALLIC INNER RIMS
Filed April 3, 1947

INVENTOR.
HARRY H. STYLL.
BY
Louis L. Gagnon
ATTORNEY

Patented July 4, 1950

2,514,103

UNITED STATES PATENT OFFICE 2,514,103

PLASTIC TOP ARM SPECTACLE FRAME HAVING METALLIC INNER RIMS

Harry H. Styll, Southbridge, Mass., assignor to American Optical Company, Southbridge, Mass., a voluntary association of Massachusetts Application April 3, 1947, Serial No. 739,082

4 Claims. (Cl. 88—41)

This invention relates to improvements in ophthalmic mountings and more particularly to a semi-rimless ophthalmic mounting and to new and improved processes for making the same.

A principal object of the invention is to provide a new and improved semi-rimless mounting having a plastic like frame comprising bridging and rim portions and metallic securing means for supporting the frame and temples.

Another object of the invention is to provide a new and improved semi-rimless mounting having a plastic like frame and metal frame securing means, temple supports and temples.

Another object of the invention is to provide new and improved processes for making the mounting.

Other objects and advantages of the invention will become apparent from the following description taken in conjunction with the accompanying drawings. It will be apparent that many changes in the details of construction, arrangement of parts and steps in the processes may be made without departing from the invention as set out in the accompanying claims. The preferred forms, arrangements and matters have been set forth by way of illustration only.

In ophthalmic mountings made of non-metallic plastic like material it is most difficult to secure the frame to the lenses if the lower edges of the lenses are left rimless, and the lens rims do not entirely encircle the edges around the whole lens. In addition, it is difficult to find means of using metal temples and temple arm supports with a plastic like frame. It is therefore a principal object of the invention to provide new and improved means of making an ophthalmic mounting that will overcome these difficulties in a simple, efficient and economical way.

Referring to the drawings.

Referring to the drawings wherein similar reference characters refer to corresponding parts throughout.

Figure 1:
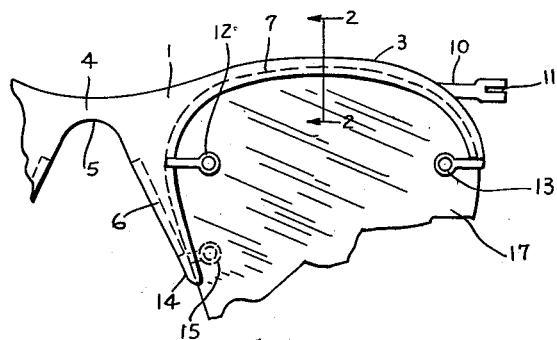
Fig. 1 is a partial front view of an ophthalmic mounting embodying the invention, one lens and the central bridging portion only is shown, the unshown parts being identical with those shown.
Figure 3:
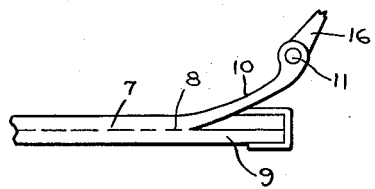
Fig. 3 is a partial top view of a portion of the inner rim showing the construction of the temple arm support.
Figure 2:
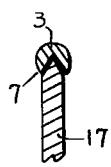
Fig. 2 is a cross section on line 2—2 of Fig. 1.
Figure 4:
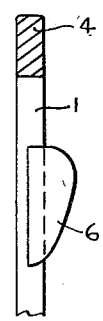
Fig. 4 is a vertical cross section through the center of the bridging portion showing the rearwardly offset nose guards.
Figure 5:
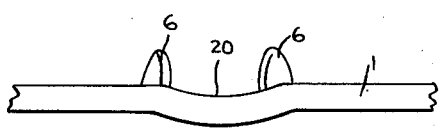
Fig. 5 is a partial top view at the center of the bridging portion showing the arch across the nose and the nose guards.

The main frame 1 of the mounting is made of a non-metallic plastic like material and comprises lens rim portions 3, and a central bridging portion 4. The rim portions 3 extend from the central bridging portion 4 to points adjacent the outer, upper edges of the lenses. The central bridging portion 4 is cut out on its lower edge at 5 to clear the nose. It is also arched forwardly at 20 across the nose and is also provided with nose guards 6, which are integral members and extend rearwardly of the frame to bear on the sides of the nose as shown in Fig. 4.

A metal inner rim 7 is rolled under pressure into a recess on the underside of each rim section 3 of the frame, the edges of the recess in the plastic like rim members are turned over the edges of the metal rim 7 to prevent transverse separation of the rim members, but the plastic like rim member is left free to move longitudinally with respect to the metal rim member to accommodate expansion and contraction in said member.

The metal inner rim 7 is cut or split at 8, adjacent the temple side into two branches, one branch 9 following the lens edge and the other branch 10 is bent rearwardly and shaped into a temple supporting arm extending rearwardly and outwardly and terminating in a pivoted temple connection at 11. The rim portion of the frame is notched or cut away to clear the arm 10 where it leaves the line of the rim. Lens connecting members or straps 12 and 13 are carried by the metal inner rim, 13 adjacent the central bridging portion and 13 adjacent the end of the plastic like rim portion at a point adjacent the upper outer edge of the lenses.

The lens connecting members or straps 12 and 13 may have one lens engaging ear engaging only one face of the lens or it may have two ears, one on each face of the lens. The lens engaging members or straps are secured to the lenses by lens screws or other means usual in the art.

The lens strap 12 as shown in full lines is located adjacent a point on a horizontal line passing through the optical centers of the lenses. If desired however to hold the lower end of the central bridging member at 14 more securely in relation to the lens edge the strap 12 may be moved down to 15 as shown in dotted lines, if the strap used is located at 15, the inner rim is extended downwardly from the strap 12 position to carry the strap in the position at 15. The straps 12 and 13 may be integral with the inner rim or they may be separate members secured thereto.

Metal temples 16 are pivotally connected to the temple supporting arms 10 at 11.

The lenses are indicated by the reference character 17.

The plastic like frame gives the appearance of an all non-metallic frame. This frame is secured in alignment with the lenses by means of the metal inner rim 7 and its associated lens straps 12 and 13. The temple supporting arms 10 are of metal and are adjustable by bending to position the temples as required by the facial characteristics of the wearer, particularly the distance between the temples to suit the width of the head of the wearer.

This construction provides the all plastic like appearance of the frame and provides means for supporting and carrying the more adjustable, smaller and neater metal temples and temple supporting arms. The whole assembly provides a new and improved ophthalmic mounting of the appearance desired together with the security of the metal supporting, carrying, and connecting parts.

The nose guards 6 are integral with the plastic like frame 1.

The plastic like material referred to herein includes such materials as methacrylate, cellulose acetate, cellulose nitrate or the like. Mountings made of these materials are termed zylonite in the art. They are also referred to as imitation tortoise shell. Natural substances, such as tortoise shell, may be and are used. The term plastic like material herein is intended to include the applicable plastics, Celluloid derivatives, natural tortoise shell and all materials of similar appearance and characteristics of a non-metallic nature.

The steps in the processes of rolling the rims together may be altered as desired or required by circumstance as the order of the steps is not of the essence of the processes and the steps may be performed in various orders and sequences.

The rim sections may be rolled together under pressure at room temperature or the non-metallic plastic like rim member may be heated to make it flow more easily.

From the foregoing it will be seen that I have provided simple, efficient and economical means for obtaining all the objects and advantages of the invention and have provided a new and improved mounting.

Having described the invention I claim:

1. An ophthalmic mounting comprising a pair of lenses, and a central bridge member of plastic material having integrally formed arms extending from the opposed sides thereof to overlie the top edges of said lenses, said top edges of the lenses being beveled to a V-shape in section and having a V-shaped channelled portion of metallic material overlying said beveled top edges, with the apex of said channelled portion substantially coinciding with the apex of said V-shaped beveled top edges, and connection means carried by said channelled portion to which the lenses are secured, the temporal end of said channelled portions being slit inwardly along the apex thereof to divide said end into a pair of integral branches, the branch on the forward side of the apex continuing along the forward side of the beveled top edge of the lenses and the other branch being deflected rearwardly beyond the plane of the lenses and adapted to be connected with a temple, said integrally formed arms of the central bridge being recessed on their under side to receive said channelled portions, with their longitudinal edges turned over the adjacent edges of the channelled portions to maintain said channelled portions in assembled relation with the arms, and said arms being notched on their rearward side inwardly of their temporal end to permit the deflected branch of said channelled portions to be extended therethrough and the inner surface of the recessed portion of said arms on the rear side thereof beyond the notch being shaped to engage contiguously the adjacent portion of the beveled top edge of the lenses.

2. An ophthalmic mounting comprising a pair of lenses, and a central bridge member of plastic material having integrally formed arms extending from the opposed sides thereof to overlie the top edges of said lenses, said top edges of the lenses being beveled to a V-shape in section and having a V-shaped channelled portion of metallic material overlying said beveled top edges, with the apex of said channelled portion substantially coinciding with the apex of said V-shaped beveled top edges, the temporal end of said channelled portions being slit inwardly along the apex thereof to divide said end into a pair of integral branches, the branch on the forward side of the apex continuing along the forward side of the beveled top edge of the lenses and the other branch being deflected rearwardly beyond the plane of the lenses and adapted to be connected with a temple, and strap portions carried by said first branch and adjacent the nasal end of said channelled portion with which the lenses are secured, said integrally formed arms of the central bridge being recessed on their under side to receive said channelled portions, with their longitudinal edges turned over the adjacent edges of the channelled portions to maintain said channelled portions in assembled relation with the arms, and said arms being notched on their rearward side inwardly of their temporal end to permit the deflected branch of said channelled portions to be extended therethrough, and the inner surface of the recessed portion of said arms on the rear side thereof beyond the notch being shaped to engage contiguously the adjacent portion of the beveled top edge of the lenses.

3. A lens supporting structure for the lenses of an ophthalmic mounting, said structure comprising a central bridge member of plastic material having integrally formed arms extending from the opposed sides thereof, and a pair of V-shaped channelled portions of metallic material to engage the top edges of the lenses when assembled therewith and having means thereon to which the lenses may be secured, the temporal end of said channelled portions being slit inwardly along the apex thereof to divide said end into a pair of integral branches, the branch on the forward side of the apex continuing in the general plane of the remainder of said side of the channelled portion to engage the adjacent edge part of the lenses when assembled therewith, and the other branch being deflected rearwardly beyond said plane and adapted to be connected with a temple, said integrally formed arms of the central bridge being recessed on their under side to receive said channelled portions, with their longitudinal edges turned over the adjacent edges of the channelled portions to maintain said channelled portions in assembled relation with the arms, and said arms being notched on their rearward side inwardly of their temporal end to permit the deflected branch of said channelled portions to be extended therethrough and the inner surface of the recessed portion of said arms on the rear side thereof beyond the notch being shaped to provide a continuation of said V-shaped channel portion beyond said deflected branch and to the end of said first branch.

4. A lens supporting structure for the lenses of an ophthalmic mounting, said structure comprising a central bridge member of plastic material having integrally formed arms extending from the opposed sides thereof, and a pair of V-shaped channelled portions of metallic material to engage the top edges of the lenses when assembled therewith, the temporal end of said channelled portions being slit inwardly along the apex thereof to divide said end into a pair of integral branches, the branch on the forward side of the apex continuing in the general plane of the remainder of said side of the channelled portion to engage the adjacent edge part of the lenses when assembled therewith and supporting lens strap means thereon, the other branch being deflected rearwardly beyond said plane and adapted to be connected with a temple, said integrally formed arms of the central bridge being recessed on their under side to receive said channelled portions, with their longitudinal edges turned over the adjacent edges of the channelled portions to maintain said channelled portions in assembled relation with the arms, and said arms being notched on their rearward side inwardly of their temporal end to permit the deflected branch of said channelled portions to be extended therethrough and the inner surface of the recessed portion of said arms on the rear side thereof beyond the notch being shaped to provide a continuation of said V-shaped channel portion beyond said deflected branch and to the end of said first branch.

HARRY H. STYLL.

REFERENCES CITED

The following references are of record in the file of this patent:

UNITED STATES PATENTS

| Number | Name | Date |
|---|---|---|
| 1,440,841 | Bearles | Jan. 2, 1923 |
| 1,457,608 | Schumacher | June 5, 1923 |
| 1,494,628 | Ravenelle | May 20, 1924 |
| 2,355,053 | Carlson | Aug. 8, 1944 |
| 2,357,267 | Rohrbach | Aug. 29, 1944 |
| 2,384,815 | Cozzens | Sept. 15, 1945 |
| 2,450,711 | Bouchard | Oct. 5, 1948 |

FOREIGN PATENTS

| Number | Country | Date |
|---|---|---|
| 213,639 | Switzerland | June 3, 1941 |